United States Patent
Levin et al.

[15] 3,676,552
[45] July 11, 1972

[54] STABLE INSULIN MATERIAL

[72] Inventors: Ezra Levin, Champaign, Ill.; Ezra Levin, Champaign, Ill.

[73] Assignee: Violin Corporation, Champaign, Ill.

[22] Filed: Oct. 9, 1967

[21] Appl. No.: 673,958

[52] U.S. Cl. ................................. 424/110, 424/178
[51] Int. Cl. ............................................ A61k 17/04
[58] Field of Search ................. 424/110, 178; 167/75

[56] References Cited

UNITED STATES PATENTS

| | | | |
|---|---|---|---|
| 1,027,790 | 5/1912 | Zuelzer | 260/112.5 |
| 1,520,673 | 12/1924 | Walden | 424/110 |
| 2,503,312 | 4/1950 | Worsham et al. | 99/157 |

OTHER PUBLICATIONS

Sizer, American Brewer, Vol. 85, No. 5, pp. 29–33, 77, May, 1952.

*Primary Examiner*—Albert T. Meyers
*Assistant Examiner*—Doris J. Funderburk
*Attorney*—Burmeister & Kulie

[57] ABSTRACT

A substantially dry and substantially defatted solid pancreatic tissue material which contains active insulin in hormonal levels corresponding to the amount in an equivalent amount of fresh pancreas, but said solid material being substantially free of pancreatic enzymes. The dry product is stable at room temperature and therefore provides an improved insulin source material which can be more economically handled because of markedly smaller weight and easier handling properties, and which can be later processed to separate the insulin.

The improved, stable insulin source material is prepared by deactivating the pancreatic enzymes with acid treatment, then removing substantially all the water from the pancreas by azeotropic distillation; and removing substantially all the fat by dissolving in a fat organic solvent which is also used to form the azeotrope. The insulin present in the dry, stable material may then be conventionally separated and converted into acceptable pharmaceutical forms.

8 Claims, No Drawings

STABLE INSULIN MATERIAL

This invention relates to an insulin source material and to a method for preparing the product. In particular, the invention relates to a dry and defatted source material which has indefinite shelf life and from which the insulin may be extracted by conventional process steps.

The common practice now for separating insulin from pancreas is to start with fresh pancreas which is usually frozen. While many variations are known and practiced, such fresh pancreas is treated by a step which is generally characterized as an acidified alcohol extraction. The acid deactivates the enzymes but not the hormone, insulin and the alcohol extracts the insulin. A conventional ethyl alcohol and hydrochloric acid extraction is described, for example, in U.S. Pat. No. 2,695,861. This patent also teaches a phosphoric acid modification step which allows such an acid to be later removed as an insoluble ammonium salt. Other review articles on this subject are found in Research Today, Vol. 10, No. 3,58–86 (1954); and Science, Vol. 129, 1340–1344, (1959).

The use of fresh pancreas, of course, presents problems in handling and storage. If the fresh pancreas is not immediately processed, then extra efforts must be made to preserve the pancreas as a starting material for insulin extraction. The common procedure is to freeze the pancreas if the extraction process is not to be immediately conducted. In practice, the pancreas is commonly frozen before extraction in the commercial process.

It is evident that handling fresh pancreas presents the problem of manipulating large masses because large amounts of pancreatic tissue are required in order to obtain a given amount of extracted insulin hormone activity. This bulk handling is a serious problem and its economic implications include the cost of transportation and the man power required in handling and treating such fresh frozen pancreatic tissues. This is in addition to the refrigeration facilities which are required to both quick freeze the pancreatic tissues and to maintain the pancreatic tissues in the frozen state until it is used to extract the insulin.

An important contribution to this art would be to provide a source material for insulin extraction which is equivalent to fresh pancreas in the levels of active insulin which can be extracted from a given amount of source material, but which is of much lesser weight and has improved handling properties.

It is accordingly one primary object of the invention to provide an insulin source material which is pancreatic tissue, but which is a dry solid having a markedly reduced bulk and weight while still retaining insulin activity of the same order as found in the corresponding amount of fresh pancreatic tissue.

A still further object of the invention is a method for preparing substantially dried and substantially defatted pancreatic tissue source material which is substantially free of enzymes but which contains insulin; and from which the insulin may be extracted by conventional process steps in amounts equivalent to those obtained from corresponding amounts of fresh pancreas.

The foregoing objects are realized, as well as still other objects which will occur to practitioners, by the invention which will now be disclosed.

Insulin has been extracted from fresh or freshly frozen pancreas by conventional acid alcohol extraction, but it is now provided that fresh animal pancreas may be manipulated by novel process steps which include defatting and desiccating the fresh tissue to obtain a dry comminuted form having unimpaired insulin level activities. It is known in the art to obtain defatted and desiccated animal tissues such as pancreas by removing water as an azeotrope of water and an organic fat solvent while, simultaneously, extracting the fat by the same solvent. Such a process has been disclosed in U.S. Pat. Nos. 2,503,313 and 2,619,425 issued to the present applicant. The dried and defatted pancreatic tissue material obtained by the teachings of such patents contains concentrated levels of pancreatic enzymes such as protease, lipase, amylase, collagenase, elastase and others. This dried product, however, contains substantially no insulin because the insulin is deactivated by the foregoing pancreatic enzymes.

A process has been devised according to the present invention wherein a dry and defatted pancreatic tissue product is obtained which is substantially free of such pancreatic enzymes but which, surprisingly, has high levels of insulin which can be successfully extracted even after extended storage of the tissue material at room temperature.

By the practice of the method, the pancreatic enzymes, are deactivated in fresh pancreas by contacting fresh pancreatic tissue with sufficient amounts of acid to effect the deactivation. The acid treated tissue is then defatted and dehydrated by removing the water as an azeotrope with a fat organic solvent as disclosed in the foregoing U.S. Pat. Nos. 2,503,313 and 2,619,425. The removal of the water as an azeotrope is conducted at moderate temperatures so as not to deactivate the insulin, say below about 100° F., or below about 38° C.

While the step of deactivating the pancreatic enzymes with an acid may be practiced in a variety of ways, it is presently preferred to combine the pancreas with a strong mineral acid such as sulphuric, hydrochloric, nitric or the like. The acid-contacted pancreas is then broken into small particle sizes as by passing through a grinder. The comminuted pancreatic tissue is then delivered for immersion into a body of boiling fat organic solvent in a depressurized area so that the solvent boils at a reduced temperature.

An azeotrope of the fat organic solvent and the water is formed and removed in a distillation zone adjoining the body of boiling fat organic solvent. It is preferred to deliver a given amount of pancreatic tissue material to several times its volume of fat organic solvent so sufficient fat organic solvent is present to both form the azeotrope and to extract the fat from the pancreas. In general, three or four volumes of solvent are preferably present at any time for a given volume of tissue material, and means may be provided for replacing spent solvent continuously or otherwise. The azeotropic distillation is continued until the water content of the pancreatic tissue is reduced to desirable levels, generally below about 6 percent by weight. At this time the fat content of the pancreatic tissue has also been reduced to desirably low levels of about less than 2–3 percent by weight.

The substantially defatted and desiccated pancreatic tissue is separated from the body of fat organic solvent by means such as draining the solvent away from the depressurized areas. Additional volumes of solvent may then be introduced in a rinsing operation to remove any occluded fat which may be present. The solvents used for rinsing may also be removed by draining or the like, and the pancreatic material may then be air dried to obtain the comminuted solid. Such a solid may be stored with or without further comminution. In general, it is preferred to provide a powdered solid form which even further reduces the bulk for handling. Such a fine powdered form also facilitates subsequent extraction of the insulin therefrom by conventional process steps.

It is generally preferred to prepare the pancreatic tissue product from pork or beef pancreas, and it is preferred to use halogenated hydrocarbons of the type described in the foregoing U.S. patents. Such solvents include propylene dichloride, trichlorethylene, perchlorethylene and others. The preferred solvent is ethylene dichloride. Non-halogenated solvents may, however, also be used such as benzene, hexane, pentane, toluene, cyclopentane, cyclohexane and still others. If desired, the dehydration and defatting process may be interrupted to further reduce the particle size by mechanical means such as a grinder or ball mill. Such further comminuted particles may then be returned to the body of fat organic solvent which is heated in a container in the de-pressurized area, and defatting desiccation by distillation may be concluded to the desired low levels.

The following examples are presented to illustrate some embodiments which may be followed in the practice of this invention. Such embodiments should be construed as being only illustrative teachings, even though they are the best ones presently contemplated for serving their particular purposes.

EXAMPLE 1

Insulin Source Material

To 500 gms of frozen pork pancreas glands is added 16.5 ml of 9N sulphuric acid, and the acidified mixture is passed through a meat grinder to provide intimate mixing of the acid with the pancreatic tissue. This acid treatment destroys the pancreatic enzymes but not the insulin.

Following such thorough mixing, the acidified pancreas is placed in a flask container to which a condenser and a source of vacuum are connected. Ethylene dichloride is introduced into the flask in an amount of 2½ to 3 liters which amount will provide a body of boiling fat organic solvents sufficient to attain desired agitation of the acidified pancreas in the solvent.

A sufficient vacuum is applied to maintain 23 inches of vacuum. Heat is applied to the flask sufficient to boil the body of ethylene dichloride, and additional amounts of ethylene dichloride are added to the flask as the azeotrope is formed and removed through the condenser. The temperature of the distillation is conducted below 100° F. The azeotropic removal of water is continued until the resulting pancreatic tissue material, also called pancreatic meal, is substantially dry, that is, having a moisture content of no more than about 6 percent by weight.

The pancreatic meal is separated from the body of fat organic solvent by filtering the mixture on a Buchner funnel. Any residual or occluded fat is removed from the pancreatic meal by a plurality of washing steps with ethylene dichloride, and the meal is then air dried to provide a yield of about 100 gms of substantially dried and defatted pancreatic tissue material in which the active insulin level is comparable to that which would be extracted from a corresponding amount of fresh pancreas.

EXAMPLE 2

Insulin Extraction from Source Material

A substantially dried and defatted source material, which is obtained by the process steps of Example 1, is used as an intermediate or startinG material for conventional insulin extraction. A crude insulin concentrate is obtained by depositing a sample of such material in several volumes of water to effect an aqueous extraction. The extracted insulin is then precipitated either by adding an alcohol-ether mixture or by altering the pH to 5.2 to effect isoelectric precipitation.

It will be noted from the foregoing Example 1 that the resulting dried and defatted source material has a weight about one-fifth of the original fresh pancreas. This is a striking reduction in the weight and the mass of the material which can be used for subsequent insulin extraction. This dimensional reduction, of course, leads to immediate savings in transportation and handling, and eliminates the necessity of freezing and refrigeration. These foregoing improvements relative to the weight and bulk of the source material are accompanied by the very real improvement that there is no substantial alteration in the hormonal content over what was present in the fresh pancreatic starting material. In other words, the insulin activity level is not substantially diminished in the improved, dried and defatted solid form. A new product and process are therefore provided for handling tissue material without substantially lowering the expected insulin content.

There are many immediately apparent advantages of the new product, and one which should be explicitly described is the feasibility of extracting the insulin therefrom at a time and place removed from where the source material is prepared. The source material, for example, may be shipped to a country where it can be extracted by conventional process steps, and then converted to consumer acceptable forms. Such consumers are then relieved of the necessity of purchasing final pharmaceutical forms from a supplier who first extracts the insulin from fresh pancreas.

What is claimed is:

1. A stable and solid pancreatic product which provides an insulin source for subsequent utilization including
    comminuted pancreatic tissue material, wherein said tissue material is
    substantially free of water,
    substantially free of fat,
    substantially free of pancreatic enzymes, and
    characterized by an insulin content which is equivalent to the amount of insulin available in the corresponding amount of fresh pancreas, said insulin retaining its hormonal activity in a manner equivalent to the hormonal activity of insulin obtained from a corresponding amount of fresh pancreas.

2. A product as in claim 1 in which the dry product has a water content of less than 6 percent by weight, and has a fat content of less than 3 percent by weight.

3. A product as in claim 2 in which the comminuted tissue material is in the form of a powder.

4. A product as in claim 1 in which the pancreatic material is
    selected from the group consisting of beef and pork pancreas.

5. A method for preparing a stable insulin source material from which active insulin may be later separated without any substantial changes in the insulin levels present in an original source of fresh pancreas, including the steps of
    contacting a body of fresh pancreas containing insulin, pancreatic enzymes, water and fat with acid of a type and in sufficient amount to deactivate substantially all the pancreatic enzymes,
    combining the enzyme deactivated fresh pancreas in the comminuted state with a body of boiling organic liquid fat solvent selected from the group consisting of ethylene dichloride, trichloroethylene, propylene dichloride, perchloroethylene, benzene, hexane, pentane, toluene, cyclopentane and cyclohexane in a distillation zone which is depressurized so that the said organic liquid fat solvent boils below 100° F, said organic liquid fat solvent forming an azeotrope with water,
    withdrawing the azeotrope containing the water from the distillation zone,
    continuing the presence of the pancreas in the body of organic liquid fat solvent until substantially all the fat of the fresh pancreas is dissolved in said solvent, and
    separating the substantially dried and substantially defatted pancreatic tissue material from the body of solvent to provide a stable insulin containing material.

6. A method as in claim 5 in which the fresh pancreas is contacted with an acid selected from the group consisting of sulfuric, hydrochloric and nitric acids,
    the acid contacted pancreas is ground to provide thorough mixing of the material and the acid,
    delivering to the enzyme deactivated pancreas mixture several times its own volume of boiling ethylene dichloride solvent so that sufficient solvent is present to both remove the water from the pancreas as an azeotrope and to dissolve the fat of the pancreas.

7. A method as in claim 5 in which
    the pancreatic material is selected from the group consisting of beef and pork pancreas, and the fat organic solvent is ethylene dichloride,
    said pancreatic material is separated from the fat organic solvent by draining the solvent away from the distillation zone,
    the separated pancreatic material is treated with a plurality of ethylene dichloride washing steps, and
    the separated pancreatic material is dried to remove ethylene dichloride.

8. A method of obtaining insulin in which substantially dry and substantially defatted pancreatic material obtained by the process of claim 5 is utilized as a starting material for the production of insulin by process steps which include
    dispersing the said pancreatic material in an aqueous medium for a time sufficient to extract substantially all the insulin therein,
    separating the substantially extracted tissue material from the aqueous medium, and
    precipitating the extracted insulin in said aqueous medium.

* * * * *

PO-1050
(5/69)

UNITED STATES PATENT OFFICE
CERTIFICATE OF CORRECTION

Patent No. 3,676,552          Dated July 11, 1972

Inventor(s) Ezra Levin

It is certified that error appears in the above-identified patent and that said Letters Patent are hereby corrected as shown below:

Inventor:     Ezra Levin, Champaign, Illinois

Assignee:     Vio Bin Corporation, Champaign, Illinois

Signed and sealed this 15th day of May 1973.

(SEAL)
Attest:

EDWARD M. FLETCHER, JR.          ROBERT GOTTSCHALK
Attesting Officer                Commissioner of Patents